United States Patent [19]
Mimura

[11] Patent Number: 5,832,029
[45] Date of Patent: Nov. 3, 1998

[54] APPARATUS FOR AND METHOD OF ACQUIRING SYNCHRONIZATION FOR SPREAD-SPECTRUM COMMUNICATION SYSTEM

[75] Inventor: Yukie Mimura, Tokyo, Japan

[73] Assignee: NEC Corporation, Tokyo, Japan

[21] Appl. No.: 638,283

[22] Filed: Apr. 26, 1996

[30]      Foreign Application Priority Data

May 23, 1995   [JP]   Japan .................................. 7-123734

[51] Int. Cl.$^6$ ...................................................... H04J 13/02
[52] U.S. Cl. ................................................................ 375/208
[58] Field of Search ..................................... 370/335, 342; 375/208, 209, 210

[56]              References Cited

U.S. PATENT DOCUMENTS 5,574,754  11/1996  Kurihara et al. ........................ 375/208
5,638,362   6/1997  Dohi et al. .............................. 375/208
5,675,608  10/1997  Kim et al. ............................... 375/208

FOREIGN PATENT DOCUMENTS

5-63678   3/1993   Japan .

Primary Examiner—Melvin Marcelo
Attorney, Agent, or Firm—Young & Thompson

[57]                ABSTRACT

An input signal from an external source is correlated to a spreading code which is indicative of the difference between first and second spreading codes which are out of phase with each other thereby to produce a correlated signal. The correlated signal is compared with first and second predetermined values to detect synchronization of the input signal with either one of the first and second spreading codes. Spreading code synchronization is achieved within a shortened period of time in a spread-spectrum communication system.

16 Claims, 6 Drawing Sheets

APPARATUS FOR AND METHOD OF ACQUIRING SYNCHRONIZATION FOR SPREAD-SPECTRUM COMMUNICATION SYSTEM

BACKGROUND OF THE INVENTION

1. Field of the Invention

The present invention relates to an apparatus for and a method of acquiring synchronization for use in a spread-spectrum communication system.

2. Description of the Related Art

Figure 1:
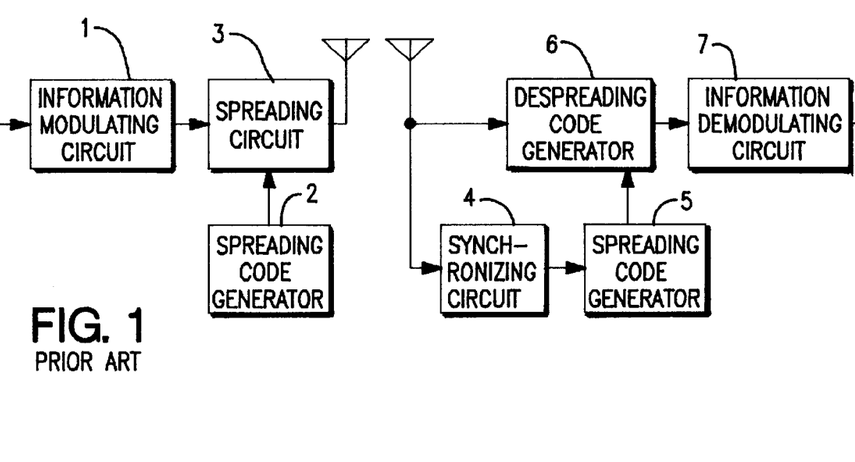
FIG. 1 is a block diagram of a conventional transmitter and receiver of a spread-spectrum communication system.

FIG. 1 of the accompanying drawings shows a transmitter and receiver of a spread-spectrum communication system. In the transmitter, input data modulated by an information modulating circuit 1 and a spreading code generated by a spreading code generator 2 and having a high transmission ratio are multiplied by a spreading circuit 3, and the multiplied data are transmitted in an increased bandwidth. In the receiver, the same spreading code as the spreading code used to spread the data in the transmitter is generated by a spreading code generator 5, and the transmitted data are despread by a despreading circuit 6 with the spreading code from the spreading code generator 5. Thereafter, the modulated data are demodulated by an information demodulating circuit 7. The spreading code in the received signal and the spreading code generated by the spreading code generator 5 need to be synchronized with each other by a synchronizing circuit 4. Heretofore, a sliding correlation process has widely been used as a method of acquiring synchronization in the spread-spectrum communication system as disclosed in Japanese laid-open patent publication No. 5-63678.

Figure 2:
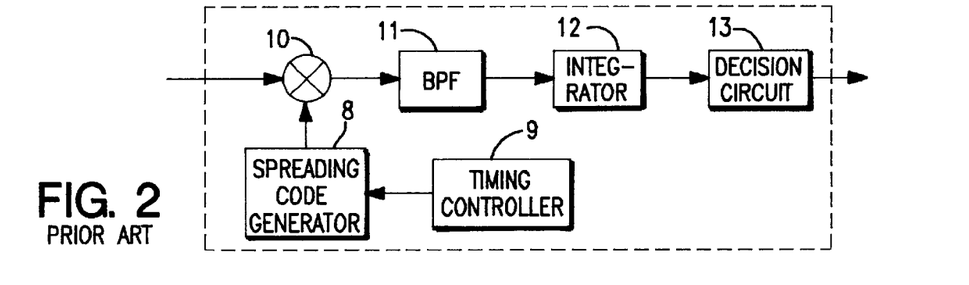
FIG. 2 is a block diagram of a conventional synchronization acquisition apparatus for the spread-spectrum communication system.
Figure 3:
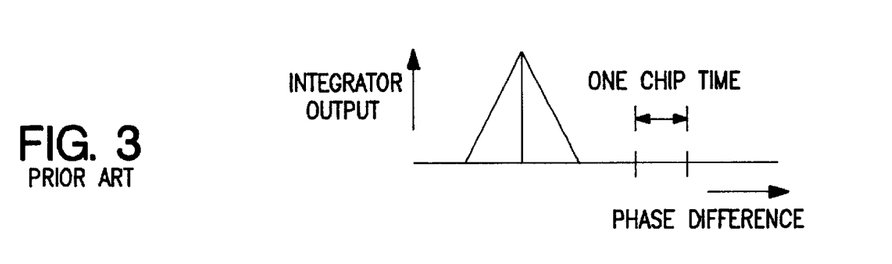
FIG. 3 is a diagram showing a phase difference, plotted on a horizontal axis, between a spreading code in a received signal and a spreading code generated in a receiver, and an integrated signal, plotted on a vertical axis, outputted from an integrator in the conventional synchronization acquisition apparatus.

One conventional synchronization acquiring device is shown in FIG. 2 of the accompanying drawings. The synchronization acquiring device has a multiplier 10 for multiplying a spreading code outputted from a spreading code generator 8 and an input signal, and a bandpass filter (BPF) 11 for filtering a product signal from the multiplier 10. The synchronization acquiring device also has an integrator 12 for integrating the filtered signal over a preset period of time. An integrated signal outputted from the integrator 12 is shown in FIG. 3 of the accompanying drawings. When the spreading codes are synchronous with each other, the integrated signal has a sharp peak value. A decision circuit 13 decides whether the integrated signal outputted from the integrator 12 has a sharp peak value due to spreading code synchronization by comparing the integrated signal with a predetermined value. A timing controller 9 generates and supplies a clock signal to the spreading code generator 8.

The clock signal generated by the timing controller 9 is controlled such that it is stopped for a certain period of time in every integral period at the integrator 12 to shift the phase of the spreading code generated by the spreading code generator 8 by a preset number of chip times, e.g., ½ chip time. As a result, the spreading code generator 8 generates a different spreading code in every integral period until the decision circuit 13 detects a peak value due to synchronization in the integrated signal outputted from the integrator 12.

According to the above process, only the result of one phase of the spreading code with respect to the input signal is obtained by a single correlating calculation.

The above conventional method using the sliding correlator is disadvantageous in that the synchronization acquisition time is long because the spreading codes are synchronized by shifting the phase of a pseudonoise code generated in the receiver one interval at a time in every integral period.

SUMMARY OF THE INVENTION

It is therefore an object of the present invention to provide an apparatus for and a method of acquiring synchronization within a shortened period of time in a spread-spectrum communication system without suffering the problems of the conventional synchronization acquisition apparatus for such a spread-spectrum communication system.

To achieve the above object, there is provided in accordance with an aspect of the present invention an apparatus for acquiring synchronization in a spread-spectrum communication system, comprising a timing controller for outputting a clock signal at predetermined intervals, a spreading code generator for generating first and second spreading codes which are out of phase with each other in timed relation to the clock signal and outputting a signal indicative of a difference between the first and second spreading codes, a correlator for multiplying an input signal supplied from an external source by the signal outputted from the spreading code generator and integrating a product signal over a preset period of time, and a decision circuit for comparing an integrated signal outputted from the correlator with first and second predetermined values to detect synchronization of the input signal with either one of the first and second spreading codes. The first and second predetermined values may comprise positive and negative values, respectively, and the decision circuit may detect synchronization of the input signal with the first spreading code if the integrated signal outputted from the correlator is greater than the first predetermined value, and detect synchronization of the input signal with the second spreading code if the integrated signal outputted from the correlator is smaller than the second predetermined value.

According to another aspect of the present invention, there is provided an apparatus for acquiring synchronization in a spread-spectrum communication system, comprising a timing controller for outputting a clock signal at predetermined intervals, a spreading code generator for generating first and second spreading codes which are out of phase with each other in timed relation to the clock signal and outputting a signal indicative of a difference between the first and second spreading codes, a correlator for multiplying an input signal supplied from an external source by the signal outputted from the spreading code generator and integrating a product signal over a preset period of time, and a decision circuit for detecting a phase at which an absolute value of an integrated signal outputted from the correlator is maximum and determining whether the integrated signal outputted from the correlator at the detected phase is positive or negative, detecting synchronization of the input signal with the first spreading code if the integrated signal outputted from the correlator is positive, and detecting synchronization of the input signal with the second spreading code if the integrated signal outputted from the correlator is negative.

According to still another aspect of the present invention, there is provided an apparatus for acquiring synchronization in a spread-spectrum communication system, comprising a timing controller for outputting a clock signal at predetermined intervals, a spreading code generator for generating a plurality of spreading codes which are out of phase with each other in timed relation to the clock signal and outputting a signal indicative of a sum of the plurality of spreading codes, a correlator for multiplying an input signal supplied from an external source by the signal outputted from the spreading code generator and integrating a product signal over a preset period of time, and a decision circuit for comparing an integrated signal outputted from the correlator with a predetermined value to detect synchronization of the input signal with either one of the plurality of spreading codes.

According to yet still another aspect of the present invention, there is provided an apparatus for acquiring synchronization in a spread-spectrum communication system, comprising a timing controller for outputting a clock signal at predetermined intervals, a spreading code generator for generating a plurality of spreading codes which are out of phase with each other in timed relation to the clock signal and outputting a signal indicative of a sum of the plurality of spreading codes, a correlator for multiplying an input signal supplied from an external source by the signal outputted from the spreading code generator and integrating a product signal over a preset period of time, and a decision circuit for detecting a phase at which an absolute value of an integrated signal outputted from the correlator is maximum and detecting synchronization of the input signal with either one of the plurality of spreading codes at the detected phase.

According to a further aspect of the present invention, there is provided a method of acquiring synchronization in a spread-spectrum communication system, comprising the steps of correlating an input signal to a spreading code which is indicative of a difference between first and second spreading codes which are out of phase with each other thereby to produce a correlated signal, and comparing the correlated signal with first and second predetermined values to detect synchronization of the input signal with either one of the first and second spreading codes. The first and second predetermined values may comprise positive and negative values, respectively, and the step of comparing may comprise the steps of detecting synchronization of the input signal with the first spreading code if the correlated signal is greater than the first predetermined value, and detecting synchronization of the input signal with the second spreading code if the correlated signal is smaller than the second predetermined value.

According to a still further aspect of the present invention, there is provided a method of acquiring synchronization in a spread-spectrum communication system, comprising the steps of correlating an input signal to a spreading code which is indicative of a difference between first and second spreading codes which are out of phase with each other thereby to produce a correlated signal, and detecting a phase at which an absolute value of the correlated signal is maximum and determining whether the correlated signal at the detected phase is positive or negative, detecting synchronization of the input signal with the first spreading code if the correlated signal is positive, and detecting synchronization of the input signal with the second spreading code if the correlated signal is negative.

According to a yet still further aspect of the present invention, there is provided a method of acquiring synchronization in a spread-spectrum communication system, comprising the steps of correlating an input signal to a spreading code which is indicative of a sum of a plurality of spreading codes which are out of phase with each other thereby to produce a correlated signal, and comparing the correlated signal with a predetermined value to detect synchronization of the input signal with either one of the first and second spreading codes.

According to a still further aspect of the present invention, there is provided a method of acquiring synchronization in a spread-spectrum communication system, comprising the steps of correlating an input signal to a spreading code which is indicative of a sum of a plurality of spreading codes which are out of phase with each other thereby to produce a correlated signal, and detecting a phase at which an absolute value of the correlated signal is maximum and detecting synchronization of the input signal with either one of the plurality of spreading codes at the detected phase.

If the spreading code generator generates first and second spreading codes which are out of phase with each other and outputs a signal indicative of the difference between the first and second spreading codes, then a positive peak appears in the integrated signal outputted from the correlator when the input signal is synchronous with the first spreading code, and a negative peak appears in the integrated signal outputted from the correlator when the input signal is synchronous with the second spreading code. Consequently, synchronization of the input signal with the first spreading code or the second spreading code is determined by detecting whether the peak value that appears in the integrated signal is positive or negative.

If the spreading code generator generates a plurality of spreading codes which are out of phase with each other and outputs a signal indicative of the sum of the plurality of spreading codes, then synchronization of the input signal with either one of the plurality of spreading codes is determined by detecting a peak value that appears in the integrated signal outputted from the correlator.

Since correlated results with respect to a plurality of phases of spreading codes are obtained by a single correlating calculation, the synchronization acquisition time can be shortened.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 4:
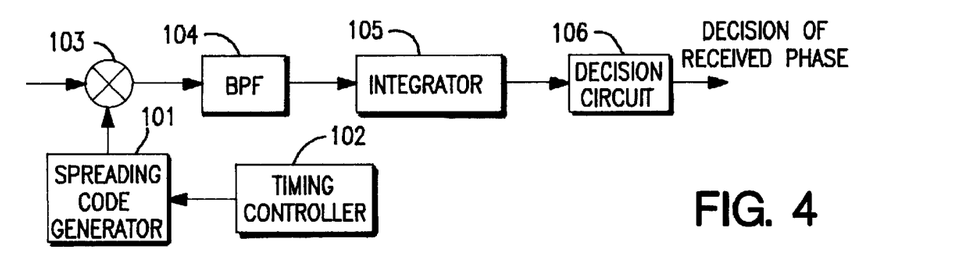
FIG. 4 is a block diagram of a synchronization acquisition apparatus for a spread-spectrum communication system according to a first embodiment of the present invention.

FIG. 4 shows in block form a synchronization acquisition apparatus for a spread-spectrum communication system according to a first embodiment of the present invention.

Figure 6:
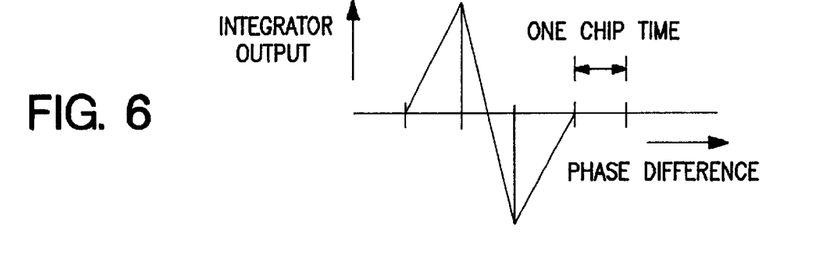
FIG. 6 is a diagram showing a phase difference, plotted on a horizontal axis, between a spreading code in a received signal and a spreading code generated in a receiver, and an integrated signal, plotted on a vertical axis, outputted from an integrator in the synchronization acquisition apparatus according to the first embodiment and a synchronization acquisition apparatus according to a second embodiment of the present invention.

As shown in FIG. 4, the synchronization acquisition apparatus has a spreading code generator 101 for generating a spreading code which represents the difference between two spreading codes that are out of phase with each other, i.e., a spreading code 1 and a spreading code 2 which lags the spreading code 1 by over one chip time. The synchronization acquisition apparatus also includes a multiplier 103, a bandpass filter (BPF) 104, and an integrator 105 which jointly serve as a correlator. The multiplier 103 multiplies an input signal by the spreading code outputted from the spreading code generator 101. A product signal outputted from the multiplier 103 is supplied through the BPF 104 to the integrator 105. Specifically, the BPF 104 filters the product signal from the multiplier 103 through a certain frequency band, and outputs the filtered signal to the integrator 105. The integrator 105 integrates the supplied signal over a preset period of time. A decision circuit 106 detects a peak value in an integrated signal outputted from the integrator 105 to determine whether a spreading code in the input signal is in synchronism with either the spreading code 1 or the spreading code 2. FIG. 6 shows the integrated signal outputted from the integrator 105 at the time the phase difference between the spreading code 1 and the spreading code 2 is one chip time.

The integrated signal outputted from the integrator 105 shown in FIG. 6 has a positive peak value when the spreading code in the input signal is in phase with the spreading code 1, and a negative peak value when the spreading code in the input signal is in phase with the spreading code 2. A timing controller 102 generates and supplies a clock signal to the spreading code generator 101. The clock signal generated by the timing controller 102 is stopped for a certain period of time in every integral period at the integrator 105 to control the timing with which to generate the spreading code 1 and the spreading code 2.

Figure 5:
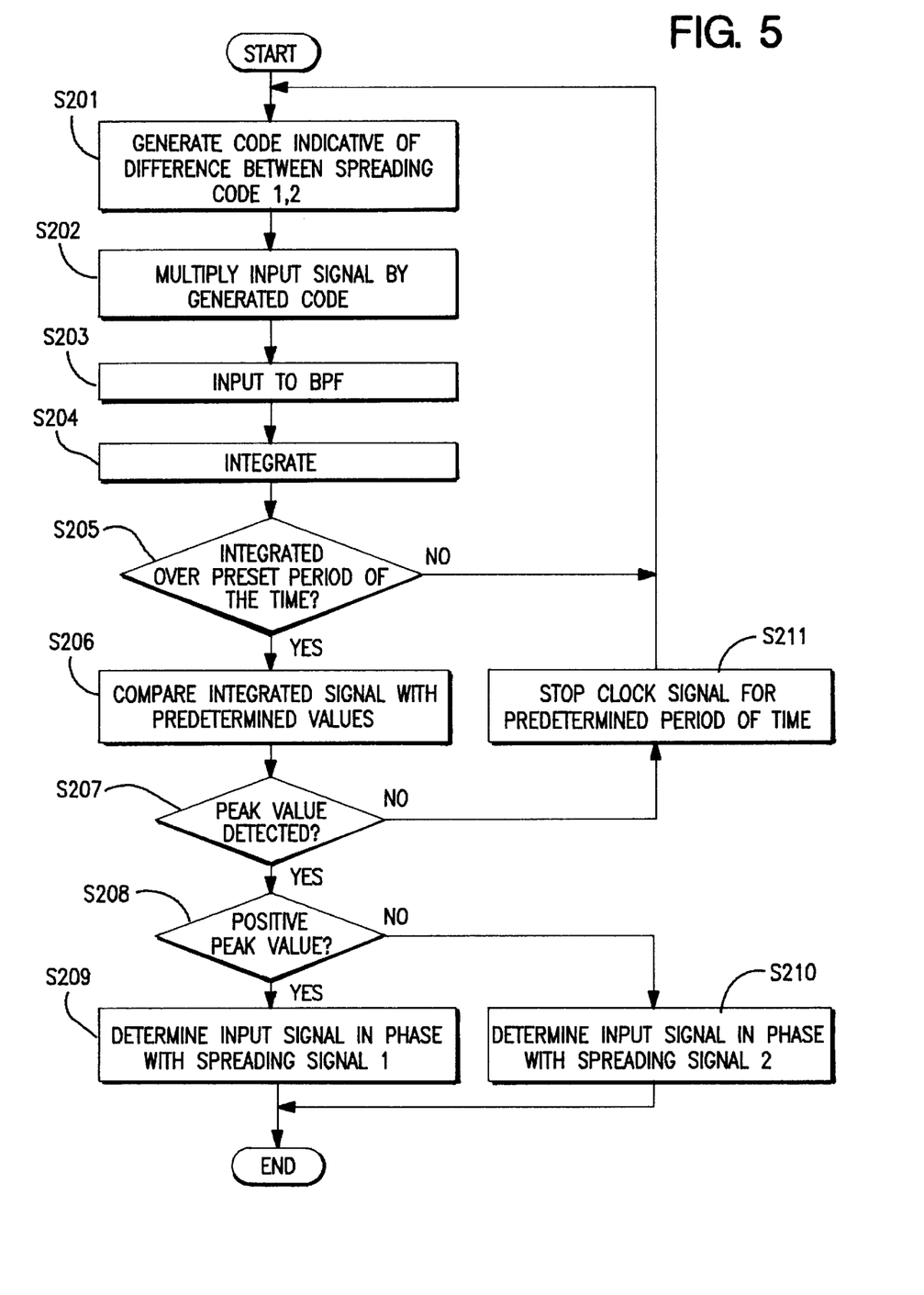
FIG. 5 is a flowchart of an operation sequence of the synchronization acquisition apparatus according to the first embodiment.

FIG. 5 shows an operation sequence of the various circuits of the synchronization acquisition apparatus according to the first embodiment.

The spreading code generator 101 generates a spreading code representative of the difference between the spreading code 1 and the spreading code 2 which lags the spreading code 1 in step S201. The multiplier 103 multiplies an input signal by the spreading code generated in step S201 in step S202. A product signal generated by the multiplier 103 passes through the BPF 104 in step S203, and is then integrated by the integrator 105 and outputted to the decision circuit 106 in step S204. The decision circuit 106 measures a master clock signal which serves as a basis for the operation of the entire synchronization acquisition apparatus to confirm whether the integrator 105 has integrated the signal from the BPF 104 over a preset period of time or not in step S205. If the integrator 105 has not integrated the signal from the BPF 104 over a preset period of time, then the decision circuit 106 does not process any input signal. In this case, therefore, steps S201 through S205 are repeatedly executed.

If the integrator 105 has integrated the signal from the BPF 104 over a preset period of time, then the decision circuit 106 compares the integrated signal outputted from the integrator 105 with predetermined values in a step S206, and, as a result, determines whether a peak value is detected in the integrated signal or not, thereby detecting spreading code synchronization or not, in step S207. The predetermined values to be compared with the integrated signal outputted from the integrator 105 are positive and negative values, respectively. Spreading code synchronization is detected only if the integrated signal outputted from the integrator 105 becomes greater than the positive value or smaller than the negative value. If no spreading code synchronization is detected in step S207, then the decision circuit 106 waits for an input signal until spreading code synchronization is detected. In this case, steps S201 through S207 are repeatedly executed. At this time, the timing controller 102 stops the clock signal for a certain period of time in every integral period at the integrator 105 in step S211, so that the spreading codes 1, 2 generated in step S201 are simultaneously shifted in phase.

If a peak value is detected, determining spreading code synchronization, in step S207, then the decision circuit 106 confirms the code outputted upon spreading code synchronization in step S208. If the code is positive, then the decision circuit 106 judges that the phase of the spreading code in the input signal is equal to the phase of the spreading code 1 in step S209, and if the code is negative, then the decision circuit 106 judges that the phase of the spreading code in the input signal is equal to the phase of the second spreading code in step S210. Then, the processing executed by the synchronization acquisition apparatus is ended.

In the above first embodiment, the spreading codes 1, 2 are out of phase with each other by over one chip time. If the spreading codes 1, 2 were out of phase with each other by less than one chip time, then decision circuit 106 would possibly fail to confirm whether the integrated signal from the integrator 106 has a peak value with respect to the spreading code 1 or the spreading code 2. However, when the spreading codes 1, 2 are out of phase with each other by at least one chip time, the decision circuit 106 can detect spreading code synchronization in the manner described above.

Figure 7:
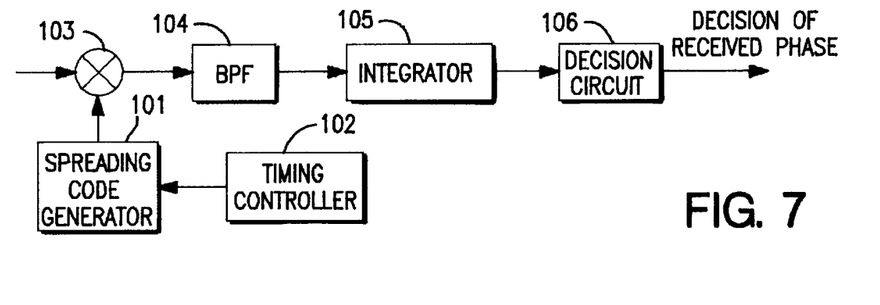
FIG. 7 is a block diagram of a synchronization acquisition apparatus for a spread-spectrum communication system according to a second embodiment of the present invention.

FIG. 7 shows in block form a synchronization acquisition apparatus for a spread-spectrum communication system according to a second embodiment of the present invention. The synchronization acquisition apparatus according to the second embodiment is of essentially the same arrangement as the synchronization acquisition apparatus according to the first embodiment except that a decision circuit 206 thereof operates in a manner different from the decision circuit 106 according to the first embodiment. Those parts shown in FIG. 7 which are identical to those shown in FIG. 4, except the decision circuit 206, are denoted by identical reference numerals, and will not be described in detail below.

Figure 8:
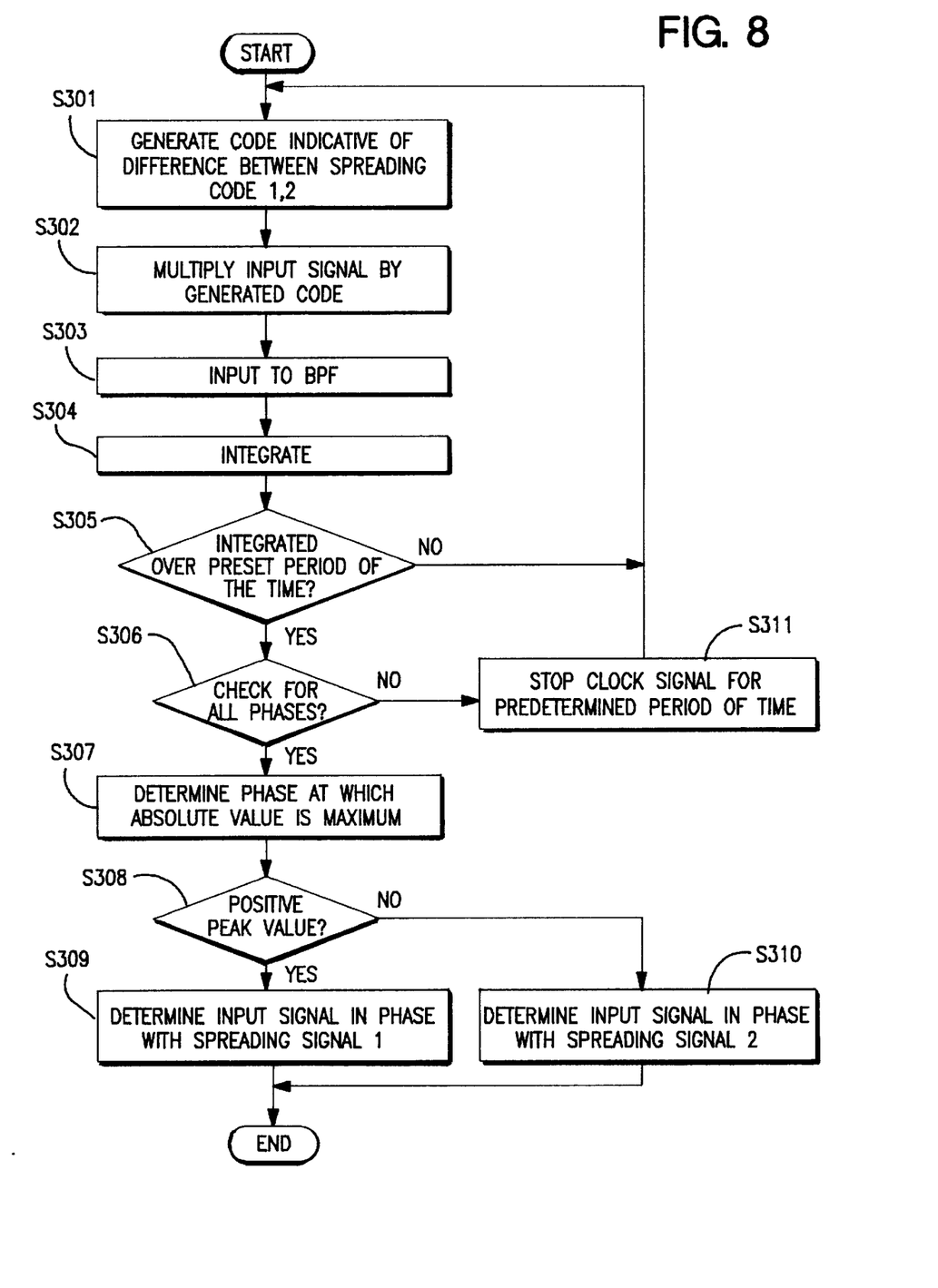
FIG. 8 is a flowchart of an operation sequence of the synchronization acquisition apparatus according to the second embodiment.

FIG. 8 shows an operation sequence of the various circuits of the synchronization acquisition apparatus according to the second embodiment.

The operation sequence shown in FIG. 8 is essentially the same as the operation sequence shown in FIG. 5 except for the operation of the decision circuit 206. Specifically, steps S301 through S305 and S308 through S311 of the operation sequence shown in FIG. 8 are identical respectively to the steps S201 through S205 and S208 through S211, and will not be described in detail below.

In the first embodiment, the decision circuit 106 compares the integrated signal outputted from the integrator 105 with predetermined values to determine whether a peak value due to spreading code synchronization is detected or not. According to the second embodiment, the decision circuit 206 waits for an input signal, i.e., steps S301 through S305 are repeatedly executed, until the integrator 105 has produced integrated signals with respect to all phases in step S306. After the integrator 105 has produced integrated signals with respect to all phases, the decision circuit 206 detects the phase at which the absolute value of the integrated signal outputted from the integrator 105 is maximum in step S307. The detected phase is established as a phase upon spreading code synchronization.

In the second embodiment, a maximum peak value is detected after the integrated signals with respect to all phases have been compared with predetermined values, unlike the first embodiment in which the integrated signal outputted from the integrator 105 is compared with predetermined values to determine spreading code synchronization. Therefore, the time required to determine spreading code synchronization in the second embodiment is liable to be longer than the time required to determine spreading code synchronization in the first embodiment. However, the synchronization acquisition apparatus according to the second embodiment is capable of detecting spreading code synchronization with a higher degree of accuracy.

Figure 9:
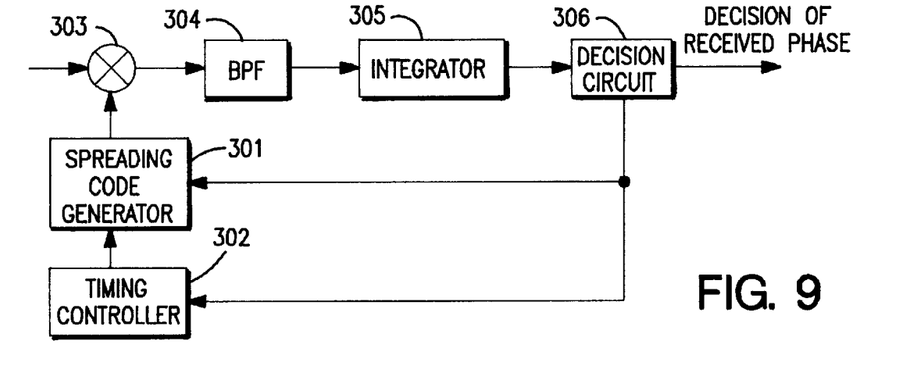
FIG. 9 is a block diagram of a synchronization acquisition apparatus for a spread-spectrum communication system according to a third embodiment of the present invention.

FIG. 9 shows in block form a synchronization acquisition apparatus for a spread-spectrum communication system according to a third embodiment of the present invention.

Figure 11:
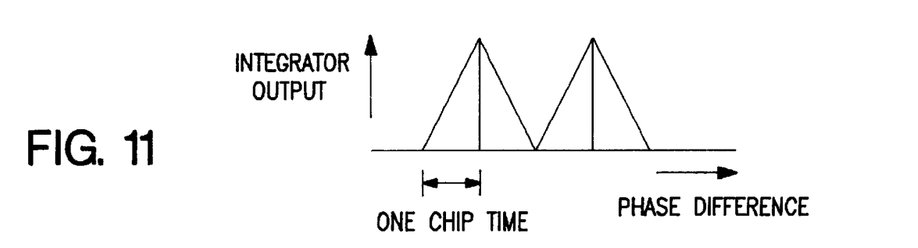
FIG. 11 is a diagram showing a phase difference, plotted on a horizontal axis, between a spreading code in a received signal and a spreading code generated in a receiver, and an integrated signal, plotted on a vertical axis, outputted from an integrator in the synchronization acquisition apparatus according to the third embodiment and a synchronization acquisition apparatus according to a fourth embodiment of the present invention.

In FIG. 9, a spreading code generator 301 generates a spreading code which represents the sum of spreading codes which are out of phase with each other, ranging from a spreading code 1 to a spreading code n (n≧2). A multiplier 303 multiplies an input signal by the spreading code outputted from the spreading code generator 301. A product signal outputted from the multiplier 303 is supplied through a BPF 304 to an integrator 305. Specifically, the BPF 304 filters the product signal from the multiplier 303 through a certain frequency band, and outputs the filtered signal to the integrator 305. The integrator 305 integrates the supplied signal over a preset period of time. A decision circuit 306 detects a peak value in an integrated signal outputted from the integrator 305. FIG. 11 shows the integrated signal outputted from the integrator 305 at the time n=2 and the phase difference between the spreading code 1 and the spreading code 2 is two chip times. The integrated signal outputted from the integrator 305 has a positive peak value when the spreading code in the input signal is in phase with the spreading code 1 and the spreading code 2. A timing controller 302 generates and supplies a clock signal to the spreading code generator 301. The clock signal generated by the timing controller 302 is stopped for a certain period of time in every integral period at the integrator 305 to control the timing with which to generate the spreading codes 1 through n to be added by the spreading code generator 301. The synchronization acquisition apparatus according to the third embodiment differs from the synchronization acquisition apparatus according to the first embodiment in that the decision circuit 306 is connected to the spreading code generator 301 and the timing controller 302.

Figure 10:
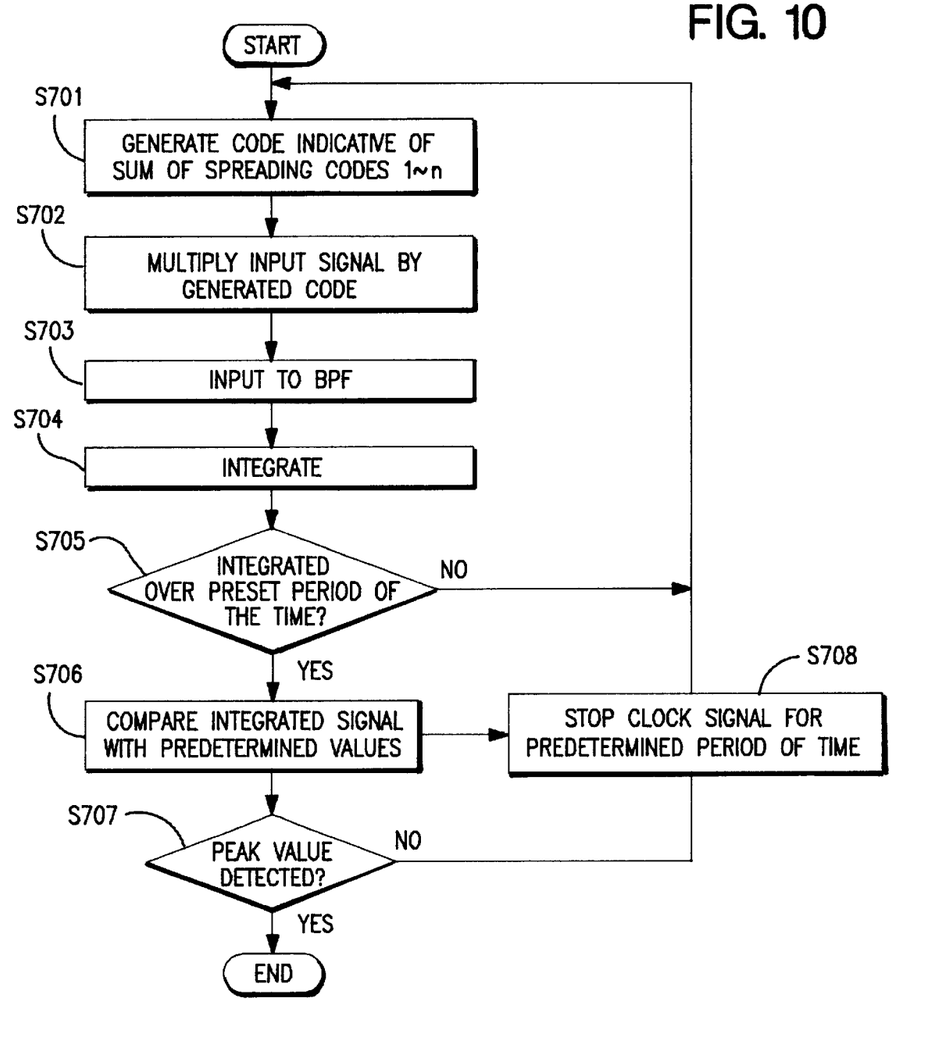
FIG. 10 is a flowchart of an operation sequence of the synchronization acquisition apparatus according to the third embodiment.

FIG. 10 shows an operation sequence of the various circuits of the synchronization acquisition apparatus according to the third embodiment.

The spreading code generator 301 generates a spreading code representative of the sum of the spreading codes 1 through n in a step S701. The multiplier 303 multiplies an input signal by the spreading code generated in step S701 in step S702. A product signal generated by the multiplier 303 passes through the BPF 304 in step S703, and is then integrated by the integrator 305 and outputted to the decision circuit 306 in step S704. The decision circuit 306 confirms whether the integrator 305 has integrated the signal from the BPF 304 over a preset period of time or not in step S705. If the integrator 305 has not integrated the signal from the BPF 304 over a preset period of time, then the decision circuit 306 waits for an input signal. Therefore, until a signal that has been integrated over a preset period of time is inputted, steps S701 through S705 are repeatedly executed.

If the integrator 305 has integrated the signal from the BPF 304 over a preset period of time, then the decision circuit 306 compares the integrated signal outputted from the integrator 305 with a predetermined value in step S706, and, as a result, determines whether the integrated signal exceeds the predetermined value in step 707. Spreading code synchronization is detected only if the integrated signal exceeds the predetermined value. If no peak value due to spreading code synchronization is detected, then the decision circuit 306 waits for an input signal, and steps S701 through S707 are repeatedly executed. At this time, the timing controller 302 stops the clock signal for a certain period of time in every integral period at the integrator 305 in step S708, so that the spreading codes 1 through n generated in the step S701 are simultaneously shifted in phase.

Figure 12:
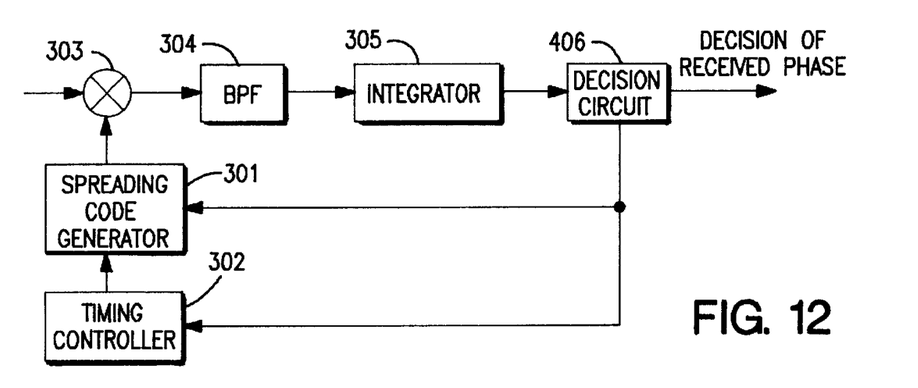
FIG. 12 is a block diagram of a synchronization acquisition apparatus for a spread-spectrum communication system according to a fourth embodiment of the present invention.

FIG. 12 shows in block form a synchronization acquisition apparatus for a spread-spectrum communication system according to a fourth embodiment of the present invention. The synchronization acquisition apparatus according to the fourth embodiment is of essentially the same arrangement as the synchronization acquisition apparatus according to the third embodiment except that a decision circuit 406 thereof operates in a manner different from the decision circuit 306 according to the third embodiment. Those parts shown in FIG. 12 which are identical to those shown in FIG. 9, except the decision circuit 406, are denoted by identical reference numerals, and will not be described in detail below.

Figure 13:
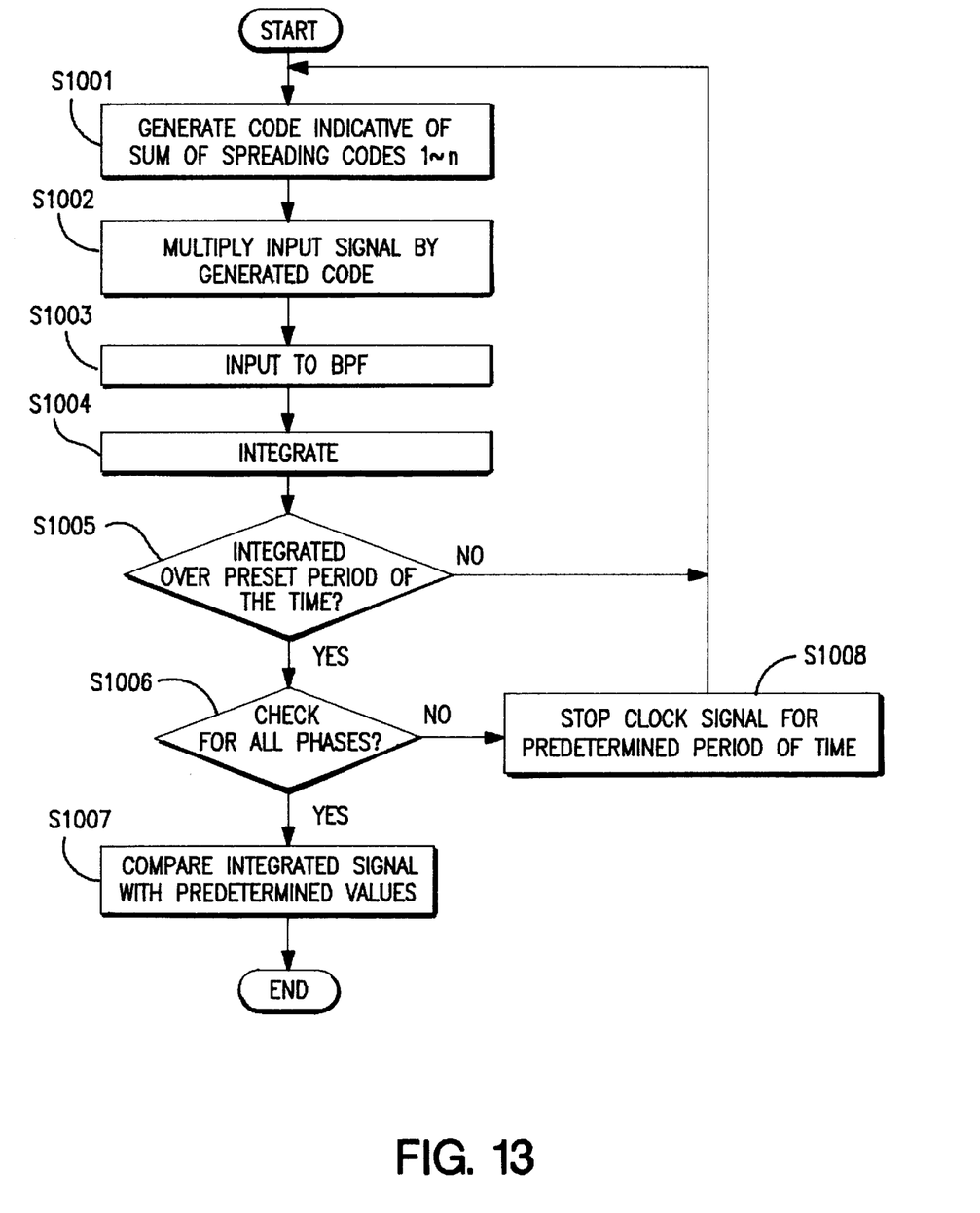
FIG. 13 is a flowchart of an operation sequence of the synchronization acquisition apparatus according to the fourth embodiment.

FIG. 13 shows an operation sequence of the various circuits of the synchronization acquisition apparatus according to the fourth embodiment.

The operation sequence shown in FIG. 13 is essentially the same as the operation sequence shown in FIG. 10 except for the operation of the decision circuit 406. Specifically, steps S1001 through S1005 and step S1008 of the operation sequence shown in FIG. 13 are identical respectively to steps S701 through S705 and step S1008, and will not be described in detail below.

In the third embodiment, the decision circuit 306 compares the integrated signal outputted from the integrator 305 with a predetermined value to determine whether a peak value due to spreading code synchronization is detected or not. According to the fourth embodiment, steps S1001 through S1005 are repeatedly executed until the integrator 305 has produced integrated signals with respect to all phases in step S1006. After the integrator 305 has produced integrated signals with respect to all phases, the decision circuit 406 detects the phase at which the absolute value of the integrated signal outputted from the integrator 305 is maximum in step S1007. The detected phase is established as a phase upon spreading code synchronization.

In the fourth embodiment, a maximum peak value is detected after the integrated signals with respect to all phases have been compared with predetermined values, unlike the third embodiment in which the integrated signal outputted from the integrator 305 is compared with predetermined values to determine spreading code synchronization. Therefore, the time required to determine spreading code synchronization in the fourth embodiment is liable to be longer than the time required to determine spreading code synchronization in the third embodiment. However, the synchronization acquisition apparatus according to the fourth embodiment is capable of detecting spreading code synchronization with a higher degree of accuracy.

In each of the above embodiments, since one integrated signal from the integrator contains integrated results relative to a plurality of phases of a spreading code, the synchronization acquisition time is reduced to about ½ of the synchronization acquisition time which is achieved using the conventional sliding correlator.

An actual signal which is inputted to the sliding correlator may possibly be subject to data modulation. In such a case, according to the first and second embodiments, the code may be confirmed as being positive or negative inversely in the steps S208, S308, possibly resulting in erroneous synchronization acquisition. Therefore, if the code may possibly be inverted due to data modulation, then it is preferable to acquire spreading code synchronization according to the third and fourth embodiments.

The spreading codes used in the embodiments of the present invention should preferably comprise a fully orthogonal code. The integrated signal outputted from the integrator 105 according to the first and second embodiments is the same as an integrated signal which is produced if the difference is calculated between product signals generated by multiplying the input signal by the respective spreading codes 1, 2. The integrated signal outputted from the integrator 305 according to the third and fourth embodiments is the same as an integrated signal which is produced if the sum is calculated of product signals generated by multiplying the input signal by the respective spreading codes 1 through n. If spreading codes which are not fully orthogonal but have a large side-lobe value of self-correlation characteristics are employed, then a peak value appearing due to spreading code synchronization in the integrated signal outputted from the integrator is reduced.

The present invention which has been described above offers the following advantages:

Since correlated results with respect to two phases are obtained by a single correlating calculation, the synchronization acquisition apparatus according to the present invention is capable of achieving faster synchronization acquisition than the conventional sliding correlation process.

The faster synchronization acquisition is further improved because information indicative of whether the spreading code contained in the input signal is synchronous with either one of the spreading codes is obtained at one time.

When correlated results with respect to two phases are obtained by a single correlating calculation, the accuracy with which to detect spreading code synchronization is increased.

Inasmuch as correlated results with respect to a plurality of phases are obtained by a single correlating calculation, the synchronization acquisition apparatus according to the present invention is capable of achieving faster synchronization acquisition than the conventional sliding correlation process.

When correlated results with respect to a plurality of phases are obtained by a single correlating calculation, the accuracy with which to detect spreading code synchronization is increased.

While preferred embodiments of the present invention have been described using specific terms, such description is for illustrative purposes only, and it is to be understood that changes and variations may be made without departing from the spirit or scope of the following claims.

What is claimed is:

1. An apparatus for acquiring synchronization in a spread-spectrum communication system, comprising:

a timing controller for outputting a clock signal at predetermined intervals;

a spreading code generator for generating first and second spreading codes which are out of phase with each other in timed relation to said clock signal and outputting a signal indicative of a difference between said first and second spreading codes;

a correlator for multiplying an input signal supplied from an external source by said signal outputted from said spreading code generator and integrating a product signal over a preset period of time; and a decision circuit for comparing an integrated signal outputted from said correlator with first and second predetermined values to detect synchronization of said input signal with either one of said first and second spreading codes.

2. An apparatus according to claim 1, wherein said first and second predetermined values comprise positive and negative values, respectively, said decision circuit comprising means for detecting synchronization of said input signal with said first spreading code if said integrated signal outputted from said correlator is greater than said first predetermined value, and detecting synchronization of said input signal with said second spreading code if said integrated signal outputted from said correlator is smaller than said second predetermined value.

3. An apparatus for acquiring synchronization in a spread-spectrum communication system, comprising:

a timing controller for outputting a clock signal at predetermined intervals;

a spreading code generator for generating first and second spreading codes which are out of phase with each other in timed relation to said clock signal and outputting a signal indicative of a difference between said first and second spreading codes;

a correlator for multiplying an input signal supplied from an external source by said signal outputted from said spreading code generator and integrating a product signal over a preset period of time; and a decision circuit for detecting a phase at which an absolute value of an integrated signal outputted from said correlator is maximum and determining whether the integrated signal outputted from said correlator at the detected phase is positive or negative, detecting synchronization of said input signal with said first spreading code if said integrated signal outputted from said correlator is positive, and detecting synchronization of said input signal with said second spreading code if said integrated signal outputted from said correlator is negative.

4. An apparatus for acquiring synchronization in a spread-spectrum communication system, comprising:

a timing controller for outputting a clock signal at predetermined intervals;

a spreading code generator for generating a plurality of spreading codes which are out of phase with each other in timed relation to said clock signal and outputting a signal indicative of a sum of said plurality of spreading codes;

a correlator for multiplying an input signal supplied from an external source by said signal outputted from said spreading code generator and integrating a product signal over a preset period of time; and a decision circuit for comparing an integrated signal outputted from said correlator with a predetermined value to detect synchronization of said input signal with any one of said plurality of spreading codes.

5. An apparatus for acquiring synchronization in a spread-spectrum communication system, comprising:

a timing controller for outputting a clock signal at predetermined intervals;

a spreading code generator for generating a plurality of spreading codes which are out of phase with each other in timed relation to said clock signal and outputting a signal indicative of a sum of said plurality of spreading codes;

a correlator for multiplying an input signal supplied from an external source by said signal outputted from said spreading code generator and integrating a product signal over a preset period of time; and a decision circuit for detecting a phase at which an absolute value of an integrated signal outputted from said correlator is maximum and detecting synchronization of said input signal with any one of said plurality of spreading codes at the detected phase.

6. A method of acquiring synchronization in a spread-spectrum communication system, comprising the steps of:

correlating an input signal to a spreading code which is indicative of a difference between first and second spreading codes which are out of phase with each other thereby to produce a correlated signal; and comparing said correlated signal with first and second predetermined values to detect synchronization of said input signal with either one of said first and second spreading codes.

7. A method according to claim 6, wherein said first and second predetermined values comprise positive and negative values, respectively, said step of comparing comprising the steps of detecting synchronization of said input signal with said first spreading code if said correlated signal is greater than said first predetermined value, and detecting synchronization of said input signal with said second spreading code if said correlated signal is smaller than said second predetermined value.

8. A method of acquiring synchronization in a spread-spectrum communication system, comprising the steps of:

correlating an input signal to a spreading code which is indicative of a difference between first and second spreading codes which are out of phase with each other thereby to produce a correlated signal; and detecting a phase at which an absolute value of said correlated signal is maximum and determining whether said correlated signal at the detected phase is positive or negative, detecting synchronization of said input signal with said first spreading code if said correlated signal is positive, and detecting synchronization of said input signal with said second spreading code if said correlated signal is negative.

9. A method of acquiring synchronization in a spread-spectrum communication system, comprising the steps of:

correlating an input signal to a spreading code which is indicative of a sum of a plurality of spreading codes which are out of phase with each other thereby to produce a correlated signal; and comparing said correlated signal with a predetermined value to detect synchronization of said input signal with any one of said plurality of spreading codes.

10. A method of acquiring synchronization in a spread-spectrum communication system, comprising the steps of:

correlating an input signal to a spreading code which is indicative of a sum of a plurality of spreading codes which are out of phase with each other thereby to produce a correlated signal; and detecting a phase at which an absolute value of said correlated signal is maximum and detecting synchronization of said input signal with any one of said plurality of spreading codes at the detected phase.

11. An apparatus for acquiring synchronization in a spread-spectrum communication system, comprising:

a spreading code generator for generating plural out-of-phase spreading codes and outputting a signal relating to said plural out-of-phase spreading codes;

a correlator for multiplying an input signal supplied from an external source by said signal outputted from said spreading code generator and integrating a product signal; and a decision circuit for evaluating an integrated signal outputted from said correlator to detect synchronization of said input signal with one of said plural out-of-phase spreading codes.

12. An apparatus according to claim 11, wherein said decision circuit further comprises a reference value for comparison with said integrated signal in detecting synchronization of said input signal with one of said plural out-of-phase spreading codes.

13. An apparatus according to claim 11, wherein said reference value has a negative value.

14. An apparatus according to claim 12, where said decision circuit further comprises an absolute value detector for identifying a maximum value integrated signal.

15. An apparatus for acquiring synchronization in a spread-spectrum communication system, comprising:

a timing controller for outputting a clock signal at predetermined intervals;

a spreading code generator for generating first and second spreading codes which are out of phase with each other in timed relation to said clock signal and outputting a signal indicative of a difference between said first and second spreading codes;

a correlator for multiplying an input signal supplied from an external source by said signal outputted from said spreading code generator and integrating a product signal over a preset period of time; and a decision circuit for comparing an integrated signal outputted from said correlator with first and second predetermined values to detect synchronization of said input signal with a difference between said first and second spreading codes.

16. An apparatus according to claim 15, wherein said first and second predetermined values comprise positive and negative values, respectively, said decision circuit comprising means for detecting synchronization of said input signal with said first spreading code if said integrated signal outputted from said correlator is greater than said first predetermined value, and detecting synchronization of said input signal with said second spreading code if said integrated signal outputted from said correlator is smaller than said second predetermined value.

* * * * *